United States Patent
Scherzinger

(10) Patent No.: US 10,610,986 B2
(45) Date of Patent: Apr. 7, 2020

(54) METHOD FOR POSITIONING A CAMSHAFT ELEMENT ON A SHAFT SEGMENT OF A CAMSHAFT

(71) Applicants: THYSSENKRUPP PRESTA TECCENTER AG, Eschen (LI); thyssenkrupp AG, Essen (DE)

(72) Inventor: Guido Scherzinger, Sax (CH)

(73) Assignees: THYSSENKRUPP PRESTA TECCENTER AG, Eschen (LI); THYSSENKRUPP AG, Essen (DE)

(*) Notice: Subject to any disclaimer, the term of this patent is extended or adjusted under 35 U.S.C. 154(b) by 126 days.

(21) Appl. No.: 15/566,257

(22) PCT Filed: Mar. 15, 2016

(86) PCT No.: PCT/EP2016/055529
§ 371 (c)(1),
(2) Date: Oct. 13, 2017

(87) PCT Pub. No.: WO2016/165895
PCT Pub. Date: Oct. 20, 2016

(65) Prior Publication Data
US 2018/0354082 A1 Dec. 13, 2018

(30) Foreign Application Priority Data

Apr. 17, 2015 (DE) .......................... 10 2015 206 967

(51) Int. Cl.
*F16H 53/02* (2006.01)
*B23P 19/04* (2006.01)
(Continued)

(52) U.S. Cl.
CPC ............ *B23P 19/042* (2013.01); *B25B 11/02* (2013.01); *F01L 1/047* (2013.01); *F16H 53/025* (2013.01);
(Continued)

(58) Field of Classification Search
CPC . B23P 19/042; F01L 2103/01; F01L 2103/00; Y10T 29/49293
See application file for complete search history.

(56) References Cited

U.S. PATENT DOCUMENTS 4,265,388 A * 5/1981 Takahashi ............... F01L 1/047
123/90.6
2015/0343576 A1 12/2015 Stappelmann

FOREIGN PATENT DOCUMENTS

CN 87104854 A 1/1988
CN 101509062 A 8/2009
(Continued)

OTHER PUBLICATIONS

English translation Scherzinger WO2011069591 (Year: 2011).*
(Continued)

*Primary Examiner* — Jason L Vaughan
*Assistant Examiner* — Amanda Kreiling
(74) *Attorney, Agent, or Firm* — thyssenkrupp North America, Inc.

(57) ABSTRACT

A method for positioning a cam element on a shaft segment of a camshaft with an assembly aid element may comprise arranging the shaft segment relative to a first tool such that a first distal shaft segment end of the shaft segment lies flush against a surface of the tool that is directed towards the shaft segment; arranging the cam element on the shaft segment in a pre-position; arranging a first distal end of the assembly aid element to contact the surface of the first tool that is directed towards the shaft segment such that the assembly aid element forms a defined distance to the first tool along a shaft-segment longitudinal axis; and moving a second tool at least in sections along the longitudinal axis until the second tool contacts a second distal end of the assembly aid element, and pushing the cam element by means of the second tool to a final position.

11 Claims, 4 Drawing Sheets

(51) Int. Cl.
*B25B 11/02* (2006.01)
*F01L 1/047* (2006.01)

(52) U.S. Cl.
CPC ... *B23P 2700/02* (2013.01); *F01L 2001/0471* (2013.01); *F01L 2103/00* (2013.01); *F01L 2103/01* (2013.01)

(56) References Cited

FOREIGN PATENT DOCUMENTS

| | | | |
|---|---|---|---|
| CN | 101832159 | A | 9/2010 |
| DE | 2838995 | A | 3/1979 |
| DE | 102012025442 | A | 6/2014 |
| DE | 102013012533 | A | 1/2015 |
| JP | 2002-239846 | A | 8/2002 |
| JP | 54-41266 | B2 | 6/2010 |
| JP | 2011-127506 | A | 6/2011 |
| JP | 2012213817 | A | 11/2012 |
| JP | 2015-163785 | A | 9/2015 |
| WO | 2011069591 | A | 6/2011 |
| WO | 2011076330 | A | 6/2011 |

OTHER PUBLICATIONS

Scherzinger WO2011069591 drawings (Year: 2011).*
English Translation of International Search Report issued in PCT/EP2016/055529, dated Jun. 16, 2016 (dated Jun. 22, 2016).
English abstract of DE102013012533A.

* cited by examiner

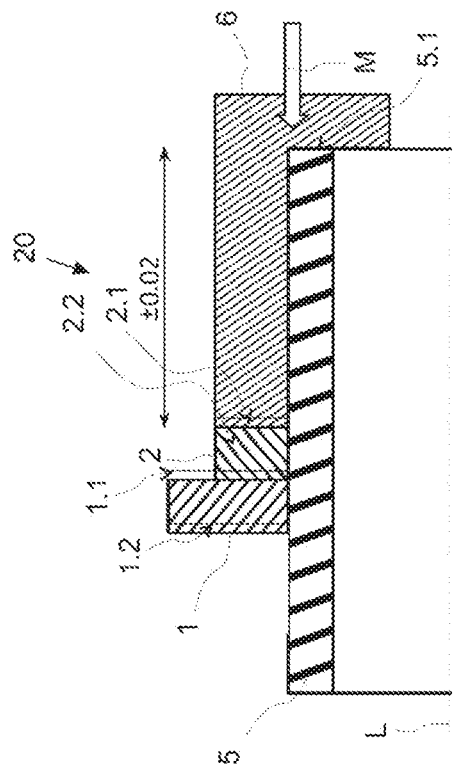
Fig.1b (Prior Art)
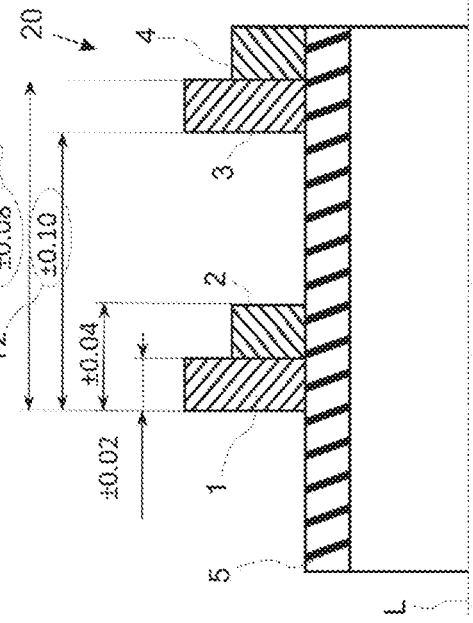
Fig.1d (Prior Art)
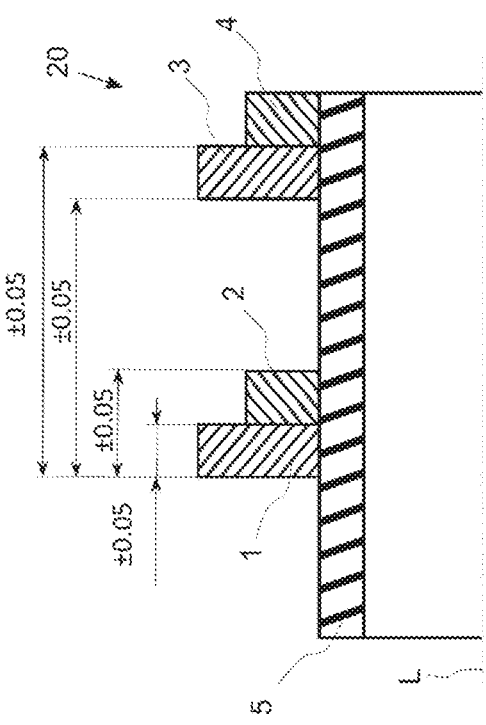
Fig.1a
Fig.1c (Prior Art)

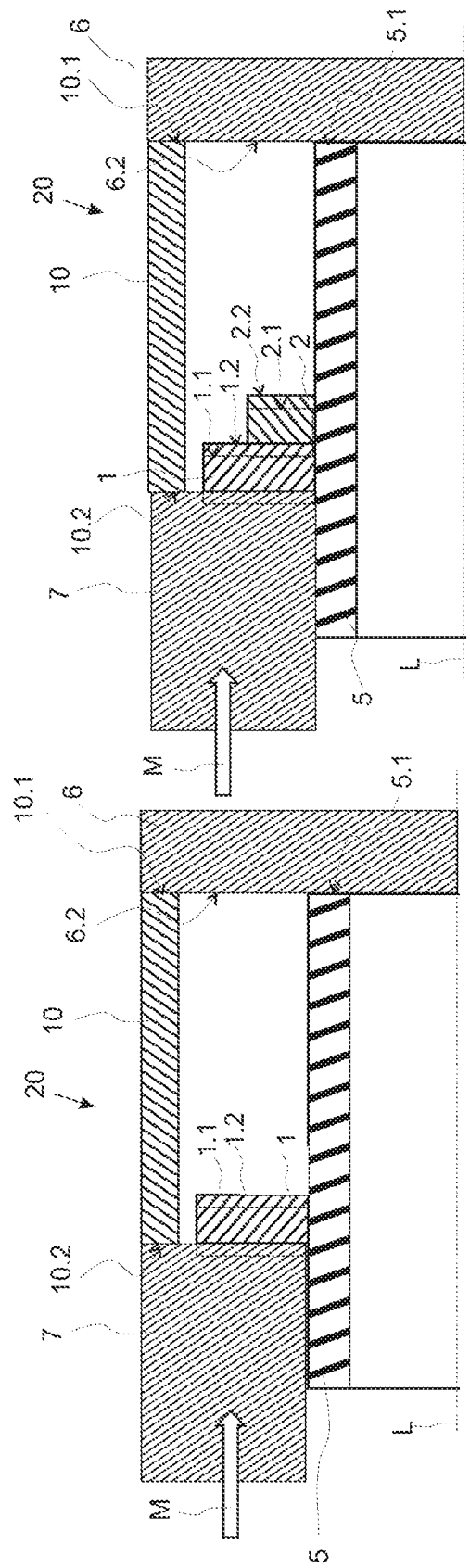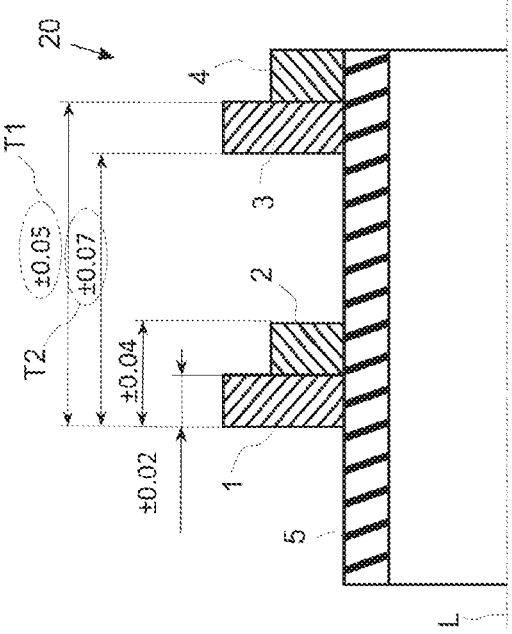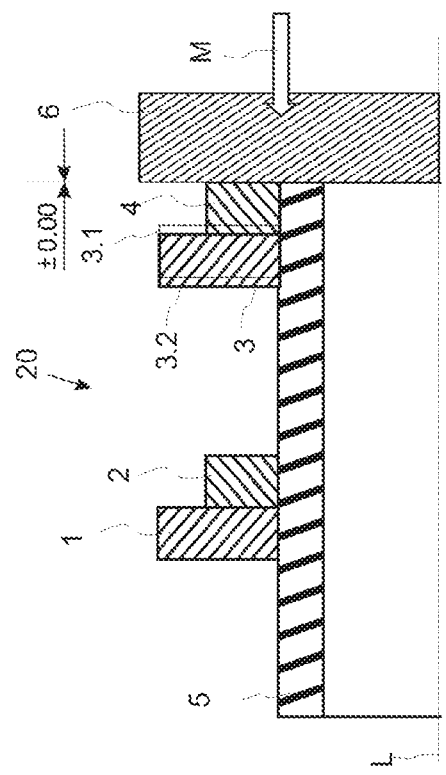

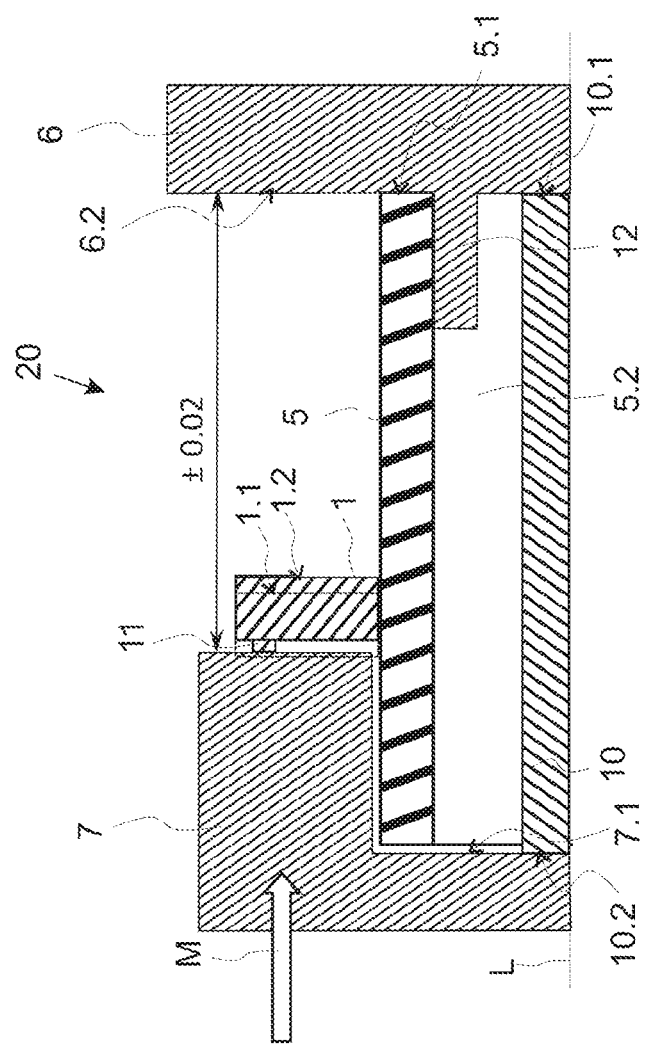

METHOD FOR POSITIONING A CAMSHAFT ELEMENT ON A SHAFT SEGMENT OF A CAMSHAFT

CROSS REFERENCE TO RELATED APPLICATIONS

This application is a U.S. National Stage Entry of International Patent Application Serial Number PCT/EP2016/055529, filed Mar. 15, 2016, which claims priority to German Patent Application No. DE 10 2015 206 967.2 filed Apr. 17, 2015, the entire contents of both of which are incorporated herein by reference.

FIELD

The present disclosure generally relates to camshafts, including methods for positioning camshaft elements on shaft segments.

BACKGROUND

Basically, it is known that camshafts control the gas exchange and therefore the combustion of an internal combustion engine of a motor vehicle. They are driven by the crankshaft. Its rotational movement is consequently in an accurately defined ratio to the rotational movement of the crankshaft and therefore to the position of the pistons in the cylinders. Furthermore, it is basically known that camshafts, particularly assembled camshafts, comprise a wide variety of components, such as a shaft tube and the cams, and further functional elements which are produced separately and then assembled together. As a result of this, a weight saving of up to 40 percent is possible compared with camshafts produced from only one material. A mass to be moved which is reduced in such way consequently leads to an optimized vibration behavior and to a low fuel consumption of the internal combustion engine.

In principle, a multiplicity of joining methods for producing assembled camshafts are known. These differ in the type of connection. So, there are for example the materially bonding fastening of the functional parts by soldering, welding or sintering, or also the direct frictionally engaging fastening, such as cams fastened by means of a cylindrical press fit. It is also conceivable that the cams are fastened on the carrier shaft in a frictionally engaging manner indirectly via conical intermediate elements or that these are fitted onto the carrier shaft directly in a positive locking manner by means of a splined shaft connection. Furthermore, cam elements which are fastened in a positively locking manner indirectly with the aid of a feather key are also known as well as a materially bonding connection of camshaft segments with cams. During the assembly of the camshaft, particularly the correct positioning of the cam elements on the shaft segment of the camshaft poses a challenge during the assembly process. Taking into consideration customer requirements with regard to small (positional) tolerances, it is necessary to realize an exact positioning of the individual cam elements on the shaft segment. Due to the tolerance deviations of the shaft segment itself as well of the individual cam elements with regard to their geometric dimensions, the assembly process, when arranging a cam element on the shaft element, involves the risk of not being able to meet the defined customer requirements. It is basically known that during the assembly process of the cam element on the shaft segment use is made of a tool which from a distal end or an end face of the shaft segment pushes the cam element along the longitudinal axis of the shaft segment onto said shaft segment. In the case of excessively large geometric dimensioning of the shaft segment with regard to its length in combination with correspondingly wide or narrow cams, it is conceivable that in particular the positional tolerances, predetermined by the client, between the individual cams arranged on the shaft segment cannot be met by means of the known assembly method.

BRIEF DESCRIPTION OF THE FIGURES

FIG. 1a is a lateral longitudinal sectional view of a camshaft with cam elements positioned on a shaft segment, and with tolerances that have been specified.

FIG. 1b is a lateral longitudinal sectional view of a camshaft during positioning of first and second cam elements on a shaft segment according to an assembly method that is known from the prior art.

FIG. 1c is a lateral longitudinal sectional view of the camshaft shown in FIG. 1b during positioning of third and fourth cam elements on the shaft segment by means of a corresponding tool.

FIG. 1d is a lateral longitudinal sectional view of the camshaft shown in FIGS. 1b and 1c with cam elements positioned on a shaft segment and with the specification of the tolerances finally achieved by means of the method which is known from the prior art.

FIG. 2a is a lateral longitudinal sectional view of a camshaft during positioning of a cam element on a shaft segment by means of a method of the present disclosure.

FIG. 2b is a lateral longitudinal sectional view of a camshaft during positioning of a first cam element and a second cam element on the shaft segment.

FIG. 2c is a lateral longitudinal sectional view of a camshaft during positioning of third and fourth cam elements on the shaft segment.

FIG. 2d is a lateral longitudinal sectional view of a camshaft with specified tolerance measurements.

FIG. 4 is a lateral longitudinal sectional view of a camshaft during positioning of a cam element on a shaft segment.

DETAILED DESCRIPTION

Figure 3A:
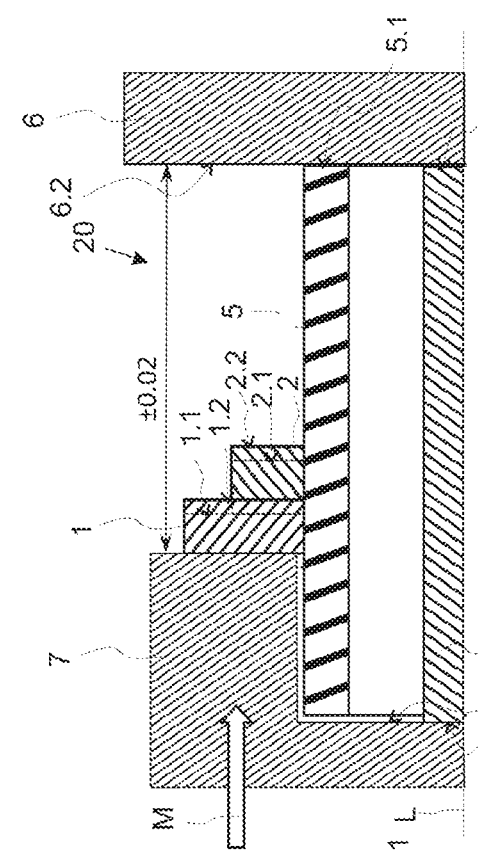
FIG. 3a is a lateral longitudinal sectional view of a camshaft during positioning of a cam element.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to at least partially eliminate the previously described disadvantages in a method for positioning at least one cam element. To that end, the present disclosure generally concerns methods for positioning at least one cam element on a shaft segment of a camshaft, which in a simple and cost effective manner enables an arrangement of a cam element on the shaft segment while meeting the strict specifications with regard to positional tolerances.

The method according to the invention for positioning at least one cam element on a shaft segment of a camshaft by means of an assembly aid element comprises at least the following steps:
  arranging the shaft segment relative to a first tool in such a way that a first distal shaft segment end of the shaft segment lies flush against a surface of the tool which is directed towards the shaft segment,
  arranging the cam element on the shaft segment in a pre-position,
  arranging the assembly aid element, wherein a first distal end of the assembly aid element contacts the surface of the first tool, which is directed towards the shaft segment, in such a way that the assembly aid element forms a defined distance to the first tool along a shaft-segment longitudinal axis, and
  moving a second tool at least in sections along the shaft-segment longitudinal axis until the second tool contacts a second distal end of the assembly aid element, and displacing the cam element by means of the second tool from the pre-position to a final position. The shaft segment itself is advantageously designed as a solid shaft or else as a hollow shaft. In the case of it being a hollow shaft, this comprises a through-hole. Consequently, it is conceivable that the shaft segment consists of two shaft bodies, that is to say a hollow shaft and a solid shaft which extends through the through-hole of the hollow shaft coaxially to said hollow shaft. The hollow shaft itself then forms the outer shaft, whereas the solid shaft forms the inner shaft of the shaft segment. In the case of there being at least two shaft bodies, which together form a shaft segment, it is conceivable that the inner shaft is designed to be rotatable relative to the outer shaft. In this case, it is also conceivable that at least one cam element is connected to the outer shaft in a rotation-resistant manner, whereas a second cam element is connected to the inner shaft in a rotation-resistant manner and advantageously supported on the outer shaft. Consequently, it is possible that in the event of a rotation of the inner shaft relative to the outer shaft the one cam can also be rotated relative to the other cam. The cam element which is to be fitted onto the shaft segment is advantageously a sliding cam element which is a component part of switchable camshaft.

In the method according to the invention, it is advantageous if the shaft segment is arranged on the first tool in such a way that its distal shaft segment end, which within the context of invention is also understood as being the end face of the shaft segment or of a shaft body of the shaft segment, lies against a surface of the tool which is directed towards the shaft segment. Consequently, this tool surface delimits the end face of the shaft segment and subsequently lies flush against the end face of the shaft segment. After the arranging of the shaft segment relative to the first tool, wherein it is also conceivable that the first tool is arranged relative to the shaft segment, an arranging of a cam element on the shaft segment is carried out at least in a first position, specifically the pre-position.

It is also conceivable, however, that the step of arranging the cam element on the shaft segment is carried out only after the arranging of the assembly aid element, as described below. A pushing of the cam element on the shaft segment is advantageously understood by an arranging of the cam element within the context of the invention. To this end, the cam element comprises at least one through-hole through which extends the shaft segment during a pushing of the cam element onto the shaft segment. The cam element itself advantageously comprises at least one cam track or a cam curve and particularly advantageously a plurality of cam tracks or cam curves for varying the timing of the valves of the internal combustion engine. Moreover, it is also conceivable that the cam element comprises at least one guide section with a guide groove for enabling insertion of an actuator pin for adjusting the cam element within a defined section of the shaft segment along the shaft-segment longitudinal axis. The assembly aid element is arranged in such a way that a distal end of the assembly aid element contacts that surface of the tool which is directed towards the shaft segment. This means that the assembly aid element lies flush against the surface of the tool, especially aligned flush with the shaft segment.

In a subsequent step in time, a second tool is moved at least in sections along the shaft-segment longitudinal axis. On account of the movement of the second tool in the direction of the first tool, starting from a second distal end of the shaft segment which is disposed opposite the first distal end of the shaft segment, the pre-positioned cam element is displaced in the direction of the first tool. The displacement of the cam element consequently also takes place along the shaft-segment longitudinal axis. The cam element is then advantageously displaced from the pre-position to a final position. The final position of the cam element is determined by the dimensioning of the assembly aid element, as considered geometrically in the direction of the shaft-segment longitudinal axis. This means that the second tool can be moved along the longitudinal axis of the shaft segment only until this makes contact with the positioned assembly aid element. The assembly aid element consequently constitutes a stop element for the second tool.

Within the context of the invention, it is conceivable that an assembly sleeve is used as the assembly aid element. The assembly sleeve is advantageously of tubular design. As a consequence, the assembly sleeve is arranged in such a way that the shaft segment extends through a through-hole of the assembly sleeve. The assembly sleeve consequently encompasses the shaft segment at least in sections. In this case, it is conceivable that the assembly sleeve is a completely closed sleeve, as seen in the circumferential direction, or else constitutes an assembly sleeve which comprises an expansion groove or an expansion slot in its circumferential wall.

Within the context of the invention, it is furthermore conceivable that an assembly mandrel is used as the assembly aid element. The assembly mandrel features a pin-like design. During an arranging of the assembly aid element, the assembly mandrel is consequently guided through the through-hole of the shaft segment and as a result advantageously extends, at least in sections, through the shaft segment completely along the through-hole. The design of the assembly aid element in the form of an assembly sleeve or else as an assembly mandrel is inexpensive to realize. Furthermore, it is conceivable that the simple geometric design of the assembly aid element in the form of an assembly mandrel or else in the form of an assembly sleeve leads to a clear determinability of the geometric length of the assembly aid element, as a result of which the defined arrangement of the cam element on the shaft segment can also be enabled.

It is furthermore conceivable that by means of the first tool the shaft segment is aligned in a machining position. This means that the shaft-segment longitudinal axis and consequently also the shaft-segment wall or the shaft-segment circumferential wall extends away basically at a right angle, that means orthogonally, from the wall of the first tool. Especially meant in this case is the wall of the tool which faces or is directed towards the shaft segment. The first tool advantageously serves for locking the shaft segment in the machining position, at least during the assembly process of the at least one cam element, so that an unwanted movement and especially a slipping of the shaft segment from a predefined position is avoided. This advantageously leads to exactly determinable positioning of the cam element on the shaft segment.

It is furthermore possible that a chuck, especially a machine chuck of an assembly plant, is used as the first tool. A chuck advantageously serves for clamping the shaft segment in a rotation-resistant or movement-resistant manner.

It is furthermore possible that the first tool comprises an inner clamping mandrel by means of which the first tool locks the shaft segment in a defined position. The inner clamping mandrel advantageously extends in this case, at least in sections, into the through-hole of the shaft segment. The inner clamping mandrel advantageously serves for locking the shaft segment in a predefined position and consequently for aligning the shaft segment for the assembly process of the cam element on the shaft segment without the stop region of the first tool for the assembly aid element being limited. The stop region of the first tool is advantageously the wall, directed towards the shaft segment, which contacts the assembly aid element.

It is furthermore possible that a gripper element, especially an assembly gripper, is used as the second tool. A gripper element serves for the simple holding of the cam element and also for the simple and inexpensively designable pushing of the cam element on the shaft segment.

Within the context of the invention, it is furthermore conceivable that the cam element is arranged on the shaft segment by means of the assembly gripper, wherein the position of the cam element inside the assembly gripper is fixed via at least one projection which is formed on an axial lateral face of the cam element. The cam element advantageously comprises more than one projection, especially two or three projections which are advantageously distributed in a uniformly spaced apart manner on the lateral face of the cam element. The design of a cam element with such a projection is described for example in DE 10 2013 012 533 A1, the disclosure of which is comprehensibly incorporated therein. A design of a cam element with projections arranged on an axial lateral face advantageously serves for a simple production of a reference surface which interacts with the second tool. As a result of this, the alignment and the positioning of the cam element on the shaft segment with regard to the optimized angular accuracy and positioning accuracy is advantageously improved. Furthermore, a design of projections on an axial lateral face of the cam element is seen to be advantageous since the projections can for example be aftermachined by surface grinding. This means that as a result instead of a complete machining of the axial lateral face only the projections have to aftermachined in order to create a reference plane. As a result of this, a simple production process for producing the cam element can also advantageously be enabled in the same way as the optimization during the positioning of the cam element on the shaft segment on account of an optimally designed reference plane for the second tool.

It is furthermore conceivable that after the arranging of the at least one cam element in a pre-position a further cam element is arranged on the shaft segment, wherein by means of the second tool both cam elements are moved at the same time along the shaft-segment longitudinal axis into their final position. Consequently, it is advantageously possible that the at least one cam element and also the further cam element are arranged in a pre-position on the shaft segment in order to be subsequently moved into their respective final position. It is also conceivable, however, that only the at least one cam element is arranged on the shaft segment in its pre-position and is moved into a final position by means of the further cam element which is pushed on the shaft segment by means of the second tool so that the further cam element has not been fitted in a pre-position but fitted directly in its final position. On account of a movement of the second tool along the shaft-segment longitudinal axis, the first and/or the second cam element is/are advantageously moved along the shaft-segment longitudinal axis in the direction of the first tool, which in turn pushes the second or first cam element ahead of it and consequently also moves it along the shaft-segment longitudinal axis in the direction of the first tool. It is furthermore conceivable that more than two cam elements, especially three or more cam elements, are also arranged on the shaft segment in a pre-position, wherein all the pre-positioned cam elements can advantageously be moved into a final position by means of the second tool.

Shown schematically in FIG. 1a is a longitudinal sectional view of a camshaft 20, especially a detail of a camshaft 20. The camshaft 20 comprises a shaft segment 5 and also cam elements 1 to 4. As shown in FIG. 1a, the camshaft 20 is shown halved along the shaft-segment longitudinal axis L. This halved view is also maintained in the following figures. The shaft-segment longitudinal axis is identified by the designation L and can also be advantageously referred to as the central shaft-segment longitudinal axis. Along the shaft-segment longitudinal axis L, as shown in FIG. 1a, four cam elements 1 to 4 are arranged on the shaft segment, wherein two cam elements 1 and 2 or 3 and 4 are arranged as a cam element pair in each case on the shaft segment 5. Also shown are tolerance measurements between the individual cam elements 1 to 4 which correspond to those tolerances which are required by the client. These tolerances need to be met during the assembly of the cam elements 1 to 4 on the shaft segment 5 of the camshaft 20.

The method known from the general prior art for positioning at least one cam element 1 on the shaft segment 5 for producing or creating a camshaft 20 is especially shown in FIG. 1b. For this, use is made of a tool 6 which moves the cam element 1 or a first cam element 1 and a second cam element 2 along the shaft-segment longitudinal axis L in the assembly direction M. It is clearly shown here that at least the first cam element 1 is moved from a pre-position 1.1 into a final position 1.2. The same is also to be said for the cam element 2 which if a pre-positioning of the second cam element 2 has taken place the second cam element 2 is moved from a pre-position 2.1 into a final position 2.2. The distal end 5.1 of the shaft segment 5 in this case forms the stop for the first tool 6 and consequently limits its movement along the shaft-segment longitudinal axis L in the assembly direction M.

After the fitting of the first cam element 1 and also of the second cam element 2, as known from the general prior art, a third cam element 3 and a fourth cam element 4 are advantageously fitted on the shaft segment 5. This is especially shown in FIG. 1c. By means of a further tool 6.1, the third cam element 3 and also the fourth cam element 4 are displaced along the shaft-segment longitudinal axis L in the same assembly direction M as the first cam element 1 and the second cam element 2 were previously moved. In the process, the third cam element 3 is advantageously moved from a pre-position 3.1 into a final position 3.2 on account of the pushing movement of the tool 6.1 and consequently of the fourth cam element 4 in the assembly direction M.

As shown in FIG. 1d, after the complete arranging of the cam elements 1 to 4 on the shaft segment 5 for creating a camshaft 20, especially the first tolerance measurement T1 or the first tolerance range T1, which describes the length from a front axial lateral face of the first cam element 1 to a rear axial lateral face of the third cam element 3, as well as the second tolerance measurement T2 or the second tolerance range T2, which describes the length from a front axial lateral face of the first cam element 1 to a front axial lateral face of the third cam element 3, are not met on account of different geometric measurements of the shaft segment 5 and/or of the individual cam elements 1 to 4 within the predetermined tolerance range. The tolerance measurements T1 and T2 which are achieved clearly exceed the tolerance measurements shown in FIG. 1a which are required by the client. An adjustment of the tolerance measurement T2 is advantageously possible by means of machining the third cam element 3 by for example the width of the third cam element 3 being reduced by grinding one of the lateral faces of the third cam element 3. Such machining cannot be implemented, however, in order to adjust the tolerance measurement T1 since machining of the rear axial lateral face of the third cam element 3 cannot be enabled on account of the arrangement of the fourth cam element 4. Consequently, it is necessary to optimize the entire assembly process in order to meet the (distance) tolerances which are required by the client.

The method claimed for this for positioning at least one cam element 1 on the shaft segment 5 is shown in FIGS. 2a to 4. Shown therefore in FIG. 2a in a lateral sectional view is a (halved) camshaft 20 which comprises a (halved) shaft segment 5 and a (halved) first cam element 1 which is to be arranged on the shaft segment 5. The cam element 1 is displaced by means of a second tool 7 along the shaft-segment longitudinal axis L in the assembly direction M from a pre-position 1.1 into a final position 1.2 in the direction of the first tool 6. The first tool 6 serves for arranging the shaft segment 5 in such a way that the first distal end 5.1 of the shaft segment 5 lies flush against a surface 6.2 of the first tool which is directed towards the shaft segment 5. Also shown in FIG. 2a is an assembly aid element 10 which for example is designed in the form of an assembly sleeve. The assembly aid element 10 extends along the shaft-segment longitudinal axis L from the tool surface 6.2 in the direction of the second tool 7. The assembly aid element 10 advantageously serves as a stop element for the second tool 7. A movement of the second tool 7 in the assembly direction M along the shaft-segment longitudinal axis L is limited by means of the assembly aid element 10, especially a (second) distal wall 10.2 of the assembly aid element 10 which is disposed opposite a first distal wall 10.1 of the assembly aid element 10. The first distal wall 10.1 of the assembly aid element 10 advantageously contacts the surface 6.2 of the first tool 6.

As shown in FIG. 2b, it is also conceivable that not only one cam element 1, but also two cam elements 1 and 2 can be moved at the same time from a pre-position 1.1 or 2.1 into a final position 1.2 or 2.2 by means of a second tool 7. To this end, a first cam element 1 and following that a second cam element 2 or vice versa is initially arranged on the shaft segment 5 in a pre-position 1.1 or 2.1. Following that, the second tool 7 is moved in the assembly direction M along the shaft-segment longitudinal axis L and at the same time pushes the first cam element 1 and the second cam element 2 into a final position 1.2 or 2.2. The displacement distance is limited by the assembly aid element 10 which serves as a stop element for the second tool 7. In comparison to the method known from the general prior art, as shown in FIGS. 1b and 1c, by means of the method according to the invention movement directly onto a stop is not by means of the axial rear side of the cam element 1, but rather the cam element 1 is moved on its axial front side by means of a tool 7, such as an anvil, until this tool 7 impacts against the assembly aid element 10, such as the assembly sleeve, which consequently forms a stop.

After the positioning the at least first cam element 1, a third 3 and a fourth cam element 4 can be arranged on the shaft segment 5, as shown in FIG. 2c. For this, the first tool 6 is briefly removed from the shaft segment 5, at least the third cam element 3 and advantageously also the fourth cam element 4 are pushed onto the shaft segment 5 into a pre-position and the first tool 6 is moved in the assembly direction M in such a way that at least the third cam element 3 is moved from a pre-position 3.1 into a final position 3.3.

It would, however, also be conceivable that the fourth cam element 4 is first of all fitted onto the shaft segment 5 in such a way that this contacts the first tool 6. Subsequently, the third cam element 3 is then advantageously pushed onto the shaft segment 5 until this contacts the fourth cam element 4. Accordingly, both cam elements 3 and 4 are already in their final position after their assembly on the shaft segment 5. The first tool 6 accordingly serves as a stop element for the fourth cam element 4 which in turn serves as a stop element for the third cam element 3. The second cam element 2 is then pushed onto the shaft segment 5 into a pre-position. The pre-position is created since no tool or other element serves as a stop element for the second cam element 2 and consequently determines its position, especially its final position, on the shaft segment. After the fitting of the second cam element 2, the first cam element 1 is fitted onto the shaft segment 5. The second tool 7, which displaces the first cam element 1 along the shaft-segment longitudinal axis L in the direction of the first tool 6, advantageously serves for this. On account of the displacement of the first cam element 1, the second cam element 2 is also displaced along the shaft-segment longitudinal axis L in the direction of the first tool 6 from a pre-position into final position. This takes place on account of the contacting of the first cam element 1 by the already pre-positioned second cam element 2 during the assembly process of the first cam element 1 on the shaft segment 5. The two cam elements 1 and 2 are displaced or moved until the second tool 7 contacts the assembly aid element 10, as a result of which the movement of the second tool 7 is limited in turn.

As shown in FIG. 2d, the method according to the invention enables the meeting of the tolerance range T1 which is predetermined by the client and optimizes at least the tolerance range T2 in comparison to the use of the method which is known in general from the prior art. Moreover, machining of the third cam element 3 also continues to be conceivable for achieving the predetermined tolerance range T2.

In FIGS. 3a to 3d, the method according to the invention is also schematically shown, wherein the assembly aid element 10 is not an assembly sleeve, as shown in FIGS. 2a to 2d, but an assembly mandrel. The assembly mandrel extends in this case through a through-hole 5.2 of the shaft segment 5. The first distal end 5.1 is again arranged flush with the surface 6.2 of the first tool 6 in this case so that a defined distance is created between the first tool 6 and the second tool 7 in order to limit a movement of the second tool 7 when the second tool 7 is moved in the assembly direction M along the shaft-segment longitudinal axis L in the direction of the first tool 6. The assembly aid element 10, which consequently is designed in the form of an assembly mandrel, therefore serves as a stop for the second tool 7. The movement of the second tool 7 in the assembly direction M is stopped as soon as a surface 7.1 of the second tool 7 contacts the second distal end 10.2 of the assembly aid element 10. The same also applies with regard to its method for positioning a cam element 1 shown in FIG. 3b, in which at least two cam elements 1 or 2 are moved from a pre-position 1.2 or 2.1 into a final position 1.2 or 2.2 in the assembly direction M.

Figure 3C:
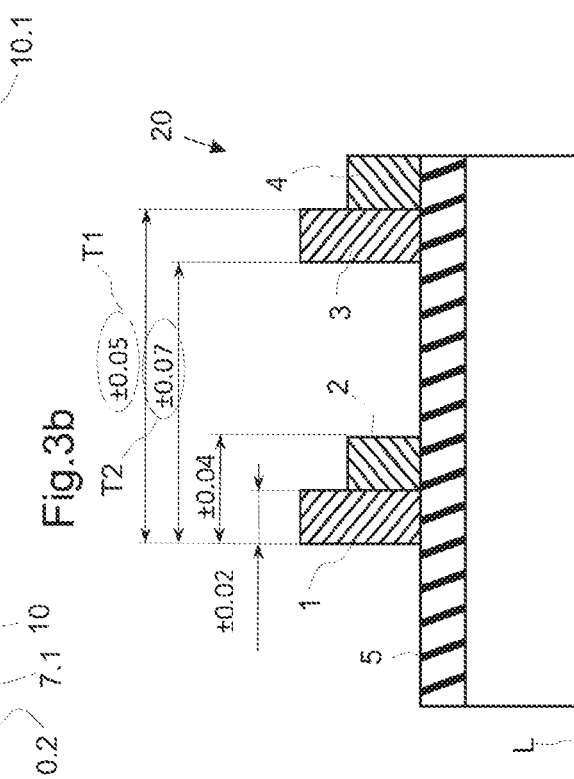
FIG. 3c is a lateral longitudinal sectional view of the camshaft shown in FIGS. 3a and 3b during positioning of third and fourth cam elements on the shaft segment.
Figure 3B:
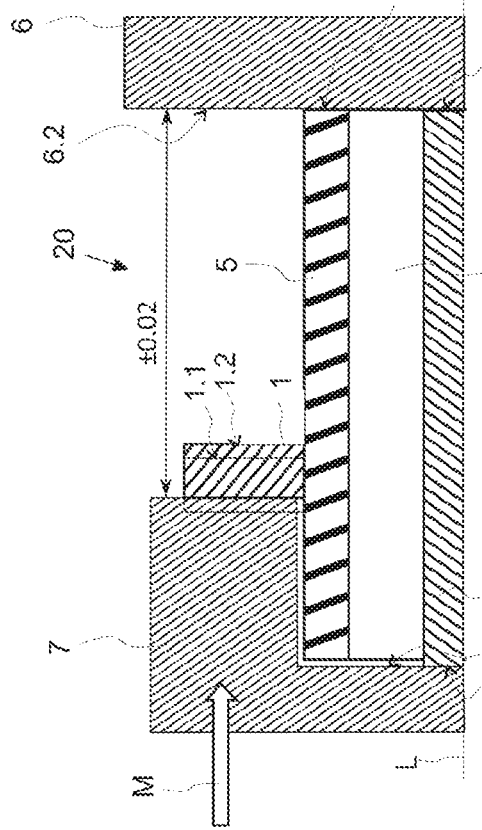
FIG. 3b is a lateral longitudinal sectional view of a camshaft during positioning of first and second cam elements.
Figure 3D:
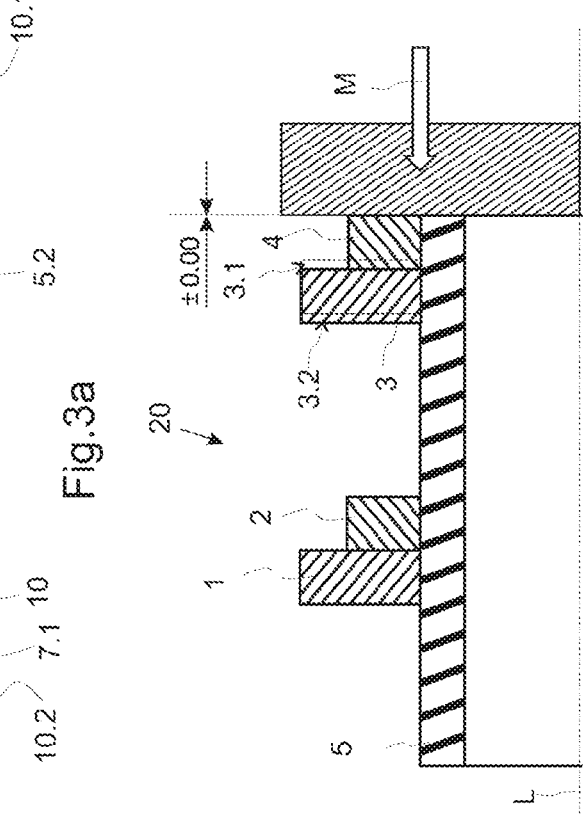
FIG. 3d is a lateral longitudinal sectional view of the camshaft shown in FIGS. 3a to 3c and also the specification of correspondingly achieved tolerance measurements.

Shown in FIG. 3c, comparable to FIG. 2c, is the positioning of further cam elements 3 and 4 on the shaft segment 5. Consequently, reference is made to the description in relation to FIG. 2c in this case. Shown in FIG. 3d is the final positioning of the cam elements 1 to 4 on the shaft segment 5 for producing the finished camshaft 20. Corresponding to the camshaft 20 shown in FIG. 2d, it also becomes clear here that especially the tolerance measurement T1 or the tolerance range T1 is met by means of the method according to the invention, whereas the tolerance measurement T2 or the tolerance range T2 can be optimized for example by means of machining the third cam element 3 by means of a machining process.

Shown in FIG. 4 is the method according to the invention shown in FIGS. 2a to 2c or 3a to 3d, wherein an assembly mandrel is used as the assembly aid element 10. However, it is also conceivable to use an assembly sleeve as the assembly aid element 10. Comparable to FIG. 2a or 3a, a first cam element 1 is moved from a pre-position 1.1 into a final position 1.2 after the arranging on a shaft segment 5, wherein a second tool 7 is moved in the assembly direction M along a shaft-segment longitudinal axis L in the direction of the first tool 6. The first cam element 1, moreover, comprises at least one projection 11 which extends away from an axial lateral wall, especially from the front axial lateral wall. The projection 11 itself advantageously serves for creating a reference surface. In this case, it is advantageous to assume therefrom that the cam element 1 comprises more than one projection 11, advantageously two and particularly advantageously three projections 11 which are arranged on the axial lateral face of the first cam element 1 in a uniformly spaced apart manner.

It is furthermore conceivable that the first tool 6 comprises an inner clamping mandrel 12 which extends inside the bore of the shaft segment 5 from the surface 6.1 of the first tool 6, which is directed towards the shaft segment 5, at least in sections along the shaft-segment longitudinal axis L. This inner clamping mandrel advantageously serves for the positioning and/or locking of the shaft segment 5 on the first tool 6 so that an unwanted movement of the shaft segment 5 is avoided when arranging and positioning the at least first cam element 1.

The exemplary embodiments shown in FIGS. 2a to 4 do not determine the requirement of completeness and are only to be seen as being exemplary. The design of the individual tools, of the shaft segment and/or of the cam elements and also of the assembly aid element is only to be considered schematically and determines no completeness.

LIST OF DESIGNATIONS 1 (First) cam element
1.1 Pre-position of the (first) cam element
1.2 Final position of the (first) cam element
2 (Second) cam element
2.1 Pre-position of the (second) cam element
2.2 Final position of the (second) cam element
3 (Third) cam element
3.1 Pre-position of the (third) cam element
3.2 Final position of the (third) cam element
4 (Fourth) cam element
5 Shaft segment
5.1 First distal shaft segment end
5.2 Through-hole
6 First tool
6.1 Further tool
6.2 Surface of the first tool
7 Second tool
7.1 Surface of the second tool
10 Assembly aid element
10.1 First distal end of the assembly aid element
10.2 Second distal end of the assembly aid element
11 Projection
12 Inner clamping mandrel
20 Camshaft
L Shaft-segment longitudinal axis
M Assembly direction
T1 (First) tolerance measurement
T2 (Second) tolerance measurement

What is claimed is:

1. A method for positioning a cam element on a shaft segment of a camshaft, the method comprising:
   positioning the shaft segment relative to a first tool such that a first distal shaft segment end of the shaft segment lies flush against a surface of the first tool that is directed towards the shaft segment;
   positioning the cam element on the shaft segment in a pre-position;
   positioning an assembly aid element so that a first distal end of the assembly aid element contacts the surface of the first tool that is directed towards the shaft segment, wherein the assembly aid element forms a defined distance to the first tool along a shaft-segment longitudinal axis; and
   moving a second tool at least in sections along the shaft-segment longitudinal axis until the second tool contacts a second distal end of the assembly aid element, whereby the second tool pushes the cam element from the pre-position to a final position.

2. The method of claim 1 wherein the assembly aid element is configured as an assembly sleeve.

3. The method of claim 1 wherein the assembly aid element is configured as an assembly mandrel.

4. The method of claim 1 wherein the first tool aligns the shaft segment in a machining position.

5. The method of claim 1 wherein the first tool is configured as a chuck.

6. The method of claim 1 wherein the first tool is configured as a machine chuck of an assembly plant.

7. The method of claim 1 wherein the first tool comprises an inner clamping mandrel, the method comprising using the inner clamping mandrel of the first tool to lock the shaft segment in a defined position.

8. The method of claim 1 wherein the second tool is configured as a gripper element.

9. The method of claim 1 wherein the second tool is configured as an assembly gripper.

10. The method of claim 9 comprising using the assembly gripper to position the cam element on the shaft segment, wherein a position of the cam element inside the assembly gripper is fixed via a projection that is formed on an axial lateral face of the cam element.

11. The method of claim 1 wherein the cam element is a first cam element, the method comprising positioning a second cam element on the shaft segment after the first cam element is positioned on the shaft segment in the pre-position, wherein the second tool moves the second cam element along the shaft-segment longitudinal axis into a final position of the second cam element at a same time as the second tool moves the first cam element along the shaft-segment longitudinal axis into the final position of the first cam element.

\* \* \* \* \*